INVENTORS
THOMAS G. LYNCH
HENRY E. DIETRICH
BY
ATTORNEY

United States Patent Office 3,417,794
Patented Dec. 24, 1968

3,417,794
SHADE SCREENING
Thomas G. Lynch, Wyckoff, and Henry E. Dietrich, River Edge, N.J., assignors to J. P. Stevens & Co., Inc., New York, N.Y., a corporation of Delaware
Continuation-in-part of application Ser. No. 536,796, Mar. 23, 1966. This application May 1, 1967, Ser. No. 635,226
3 Claims. (Cl. 139—420)

ABSTRACT OF THE DISCLOSURE

A woven fabric comprising a series of threads arranged to form bars, said bars being spaced a predetermined distance apart; a second series of groups of threads, said groups being spaced a predetermined distance apart and having at least two threads in each of said groups in said second series interlaced with alternate threads in each of the said bars, and the remaining threads in each of said groups interlaced with alternate bars whereby said bars are held in a fixed position.

---

This application is a continuation-in-part of an application filed Mar. 23, 1966, entitled, "Shade Screening," and bearing Ser. No. 536,796.

This invention relates to shade screening. In one aspect the invention relates to fiber glass shade screening.

Shade screening made from wires and non-metallic material such as textile yarns and the like are well known. The screening material of the art has suffered certain drawbacks. For example, wire screening or screening made from textile material while permitting light and air to pass through, do not generally possess good heat reflecting qualities. It is true that the heat reflecting qualities can be enhanced by the proper choice of materials; however, even in these cases good heat reflecting properties are generally not achieved. Furthermore, utilization of wires and various textile materials do not permit the manufacturing of structures which exhibit good stability and a long and useful life when subjected to use and exposure to the elements. There exists, therefore, a need for a shade screening which does not have the above disadvantages.

An object of this invention is to provide a shade screening which blocks the sun's rays before it contacts the window glass when used as an outside screening and which reflects radiant heat through the glass to the outside when used as an inside screening.

Another object of this invention is to provide a screening which reduces interior temperatures by reflecting solar heat but at the same time permits air flow through the material.

Another object of this invention is to provide a screening which provides good see-through visibility, which reduces glare and in addition to which is an effective screen protection against insects.

A still further object is to provide a screening which possesses excellent dimensional stability, a resistance to weathering, the capability of remaining substantially unaffected by ultraviolet degradation, and the capability of being easily washed or vacuumed.

Other objects and many of the attendant advantages of this invention will be readily appreciated as the same becomes better understood by reference to the following detailed description which is to be considered in connection with the accompanying drawings wherein.

Briefly, this invention is an open weave fabric comprising a plurality of bars each of which comprises at least 5 heat-reflecting coated glass fiber threads, having a denier ranging from 600 to 1200, said threads being laid in side-by-side relationship; a plurality of groups each of which comprises 3 heat-reflecting coated glass fiber threads, having a denier ranging from 600 to 1200, each of said groups being arranged substantially perpendicular to said bars wherein two of the threads of each group interlace alternate threads located in the bars and the third thread of each group interlaces alternate bars whereby said bars are held in a fixed position.

Figure 1:
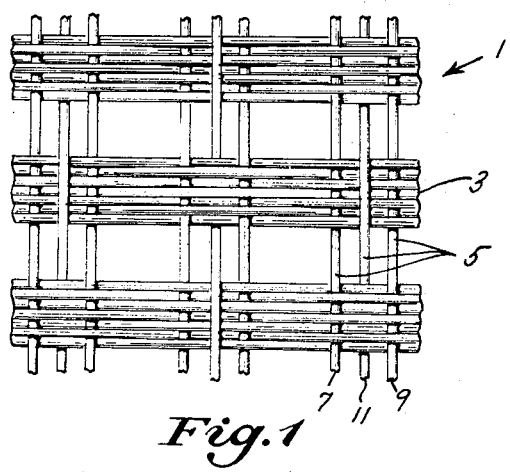
FIGURE 1 is a plan view of a portion of a shade screening according to the invention showing a first series of groups of closely spaced threads running in a fill direction, and a second series of groups of spaced threads running in a warp direction and being interlaced with the first series according to the invention.
Figure 2:
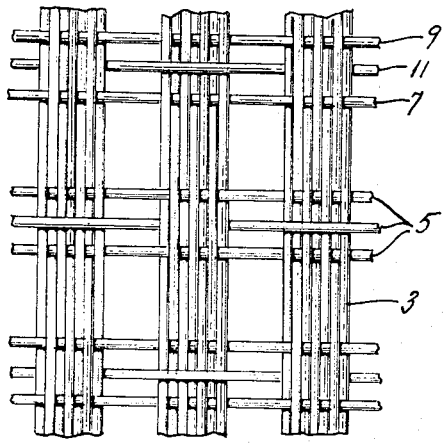
FIGURE 2 is a plan view of a portion of a shade screening according to the invention showing a series of groups of closely spaced threads running in a warp direction, and a second series of groups of spaced threads running in a fill direction and being interlaced with the first series according to the invention.

With reference to FIGURES 1 and 2 of the drawing, the shade screening pattern of this invention is an open mesh weave fiber glass fabric containing two series of groups of fiber glass threads 1. The one series of groups is arranged into bars 3 wherein the individual bars are spaced relatively wide apart and the threads within each group are spaced relatively close to each other in a side-by-side relationship. These bars can be disposed in either a fill or warp direction. It is preferred that they be disposed in a fill direction and contain seven threads.

A second series of groups of threads 5 are arranged so that at least two threads 7 and 9 in each of these groups are interlaced with alternate threads in each of the bars described hereinabove, and the remaining threads 11 in each of these groups are interlaced with alternate bars. We prefer these second series of groups of threads to have three threads to each group.

The term "thread" as employed herein is understood to include monofilament and multifilament yarns. Generally, however, in a preferred construction monofilament yarns are utilized.

It is also to be understood that all of the yarns in shade screening can be coated with a heat reflecting material and that any suitable heat reflecting material can be employed in the construction of shade screening according to the present invention. However, it is preferred that the heat reflecting material contain coloring matter such as pigments, dyes, or the like, for increasing the heat reflecting ability of the shade screening as well as for improving the decor thereof. Illustrations of such pigments and dyes include aluminum powder, colloidal silica, bronze powder, and the like.

It is also noted that shade screening fabrics can be manufactured wherein the yarns are coated with heat reflecting material which have different color pigments or dyes contained therein. In this matter, various novelty effects with respect to appearance of the material are attained.

Among the coating materials which can be used to coat fiber glass threads are polymeric substances such as polyvinyl chloride, polyethylene, polypropylene, polyurethanes, acrylics, rubber, and the like. Of these substances, polyvinyl chloride is among the preferred materials since it forms a coating on the fiber glass which results in excellent longevity even after long exposure of the coated fiber glass to the elements.

In order to achieve the best properties of longevity and heat reflecting abilities, the fiber glass yarns utilized in the manufacture of shade screening according to the invention should have a continuous coating of heat reflecting substance thereon. To insure a complete and continuous coating of heat reflecting substance, the fiber glass yarns are generally coated by contacting them with the heat reflecting substance before they are manufactured into the shade screening pattern of the invention.

It is to be understood that the fiber glass yarns can be coated in any suitable manner such as for example, by spraying the heat reflecting coating thereon, by padding the fiber glass yarns with the heat reflecting material in any convenient manner or in any other suitable way.

The coated yarns are then woven into the novel fabric construction described hereinabove according to known processes with either the warp threads or the filling threads being disposed so as to form bars of threads in close side-by-side relationship as described hereinabove. The bars are then held apart by the pattern of interlacing threads as described hereinabove.

The fiber glass yarns employed in making a shade screen according to the invention can vary in denier size from about 600 denier or less to as large as 1200 denier or more. Moreover, the denier of the yarns used for the threads forming the bars can be different from the denier of the yarns used for the threads to interlace them apart. Furthermore, if desirable the threads of different bars can be of greater or lesser denier size than the threads of other groups. Utilizing threads of varying denier size permits the manufacture of unusual shade screening fabric design. Preferably, however, the denier size of the threads in both the bar configuration and the interlacing groups are the same, and in this connection, yarns of about 600 to 700 denier are used.

The shade screening is woven in an open mesh weave. The size of the openings in the fabric should be large enough to permit both visibility and passage of light therethrough. On the other hand, the openings should not be so large that they permit passage of insects and such a great amount of sunlight that the heat reflecting qualities of the fabric are affected. It is also to the advantage of this novel screening construction, that the bars are kept from slipping so as to vary the openings between them.

EXAMPLE

The following example demonstrates the advantage of a shade screening having the pattern according to this invention.

An excellent shade screening fabric has been manufactured wherein bars formed from seven monofilament threads of 605 denier placed in the fill position and positioned apart by groups comprising three monofilament threads 605 denier arranged in the warp direction wherein at least two of these threads interlace alternate threads in each of the bars, and the third thread interlaces alternate bars in such a manner as to provide a mesh size of about 18 x 56. The threads were coated with polyvinyl chloride having a grey pigment dispersed therein.

This screening pattern was tested by the University of Florida at its Engineering and Industrial Experimental Station to determine its shading coefficients.

Figure 3:
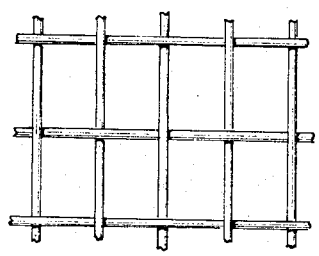
FIGURE 3 is a plan view of a portion of a shade screening made according to prior art teaching.

For purposes of control, a conventional fiber glass screening woven to provide an 18 x 14 mesh size, as shown in FIGURE 3, was also tested to determine its shading coefficient. The threads were coated with polyvinyl chloride having a grey pigment dispersed therein. The shading coefficients are set forth in the following table:

| Type of exposure | Orientation | Latitude, ° N. | Shading coefficient |
|---|---|---|---|
| Example  Indoor | East | 40 | 0.67 |
| Control  do | do | 40 | 0.78 |
| Example  Outdoor | do | 40 | 0.40 |
| Control  do | do | 40 | 0.60 |

The shading coefficient is employed in determining solar heat gain through building fenestrations. (American Society of Heating, Refrigerating and Air Conditioning Engineers Guide, chapter 27.)

A Solar Heat Gain Factor (SHGF) represents the solar heat gain through a regular sheet glass window and if multiplied by the shading coefficient provides the solar heat gain through a glass and shade combination.

In order to represent the saving in capacity required at the time of peak cooling load due to the novel construction of the fabric of this invention, assume the design time to be 4 P.M., Aug. 21, 1966, and the location to be 40° N. latitude. Assume a building which has 3000 square feet of glass in the east wall.

The solar load at the east wall due to the glass without shading would be $$3000 \times 202(SHGF) = 606,000 \text{ B.t.u.'s/hr.}$$

If the glass is shaded on the inside with the screening described in the example, the solar load due to the glass area would be $3000 \times 202 \times 0.67 = 406,020$ B.t.u.'s/hr. This represents a net reduction of 199,980 B.t.u.'s/hr. in load.

If the glass is shaded on the inside with a construction similar to FIGURE 3, the solar load due to the glass area would be $$3000 \times 202 \times 0.78 = 472,680$$

This represents a net reduction of 133,320 B.t.u.'s/hr. in load.

It is readily observed that a savings of 66,660 B.t.u.'s is achieved if screening having the improved construction of this disclosure is employed instead of the screening having a conventional weave pattern.

Thus an unusual and unexpected result is achieved by the positioning of the fill yarns even though the actual number of threads, the denier of the threads, the coating on the fiber glass as well as the mesh size are substantially the same.

Obviously many modifications and variations of the present invention are possible in the light of the above teachings. Therefore it is to be understood that within the scope of the appended claims that the invention may be practiced otherwise than as specifically described herein.

What is claimed is:

1. An open weave shade screening fabric comprising a plurality of bars each of which comprises at least five heat-reflecting coated glass fiber threads, having a denier ranging from 600 to 1200, laid in side-by-side relationship; a plurality of groups each of which comprises three heat-reflecting glass fiber threads, having a denier ranging from 600 to 1200, said groups being arranged substantially perpendicular to said bars wherein two of the threads of each group interlace alternate threads located in the bars and the third thread of each group interlaces alternate bars whereby the bars are maintained a predetermined distance from each other.

2. A shade screening fabric as defined in claim 1 wherein the fiber glass threads are monofilaments.

3. A shade screening fabric according to claim 1 further characterized in that seven 605 denier polyvinyl chloride coated fiber glass threads are laid in side-by-side relationship in the fill direction to form the bars, and three 605 denier polyvinyl chloride coated fiber glass threads form the groups in the said second series wherein two of the threads in each group interlace alternate threads in the bars, and the third thread in each group interlaces alternate bars.

References Cited

UNITED STATES PATENTS

| | | | |
|---|---|---|---|
| 1,650,998 | 11/1927 | Nones | 139—383 |
| 2,948,950 | 8/1960 | Finger et al. | 139—420 |
| 3,042,561 | 7/1962 | Wasaku | 161—92 |
| 3,114,840 | 12/1963 | Johnston | 161—93 |
| 3,199,547 | 8/1965 | Knutson et al. | 139—383 |
| 3,238,683 | 3/1966 | Maxwell | 161—92 |

HENRY S. JAUDON, *Primary Examiner.*

U.C. Cl. X.R.

139—426; 161—92